L. SCHMIDT.
FRICTION BRAKE AND RATCHET.
APPLICATION FILED FEB. 14, 1914.
1,171,357.
Patented Feb. 8, 1916.
2 SHEETS—SHEET 1.
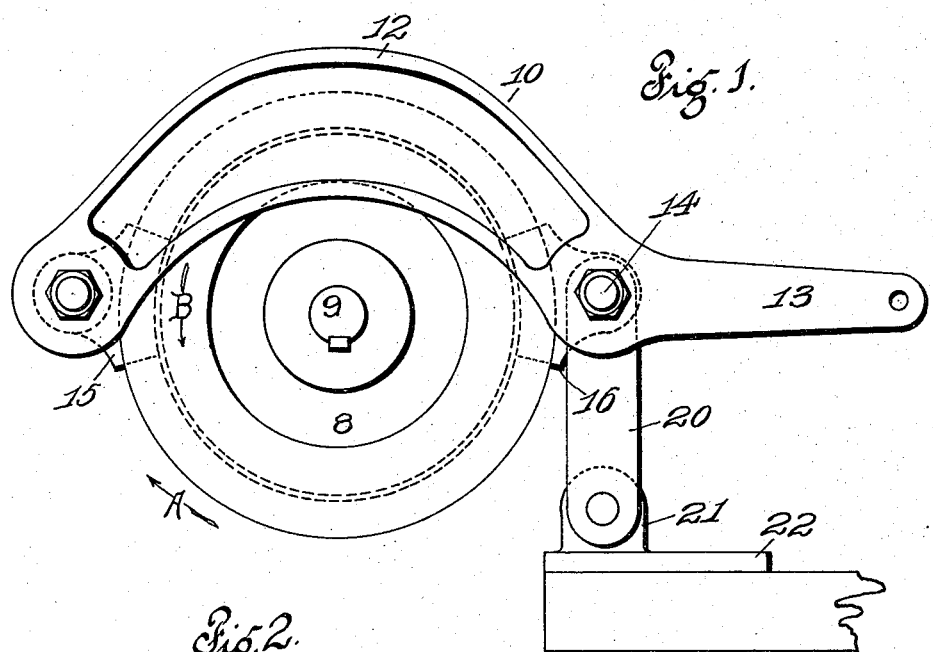
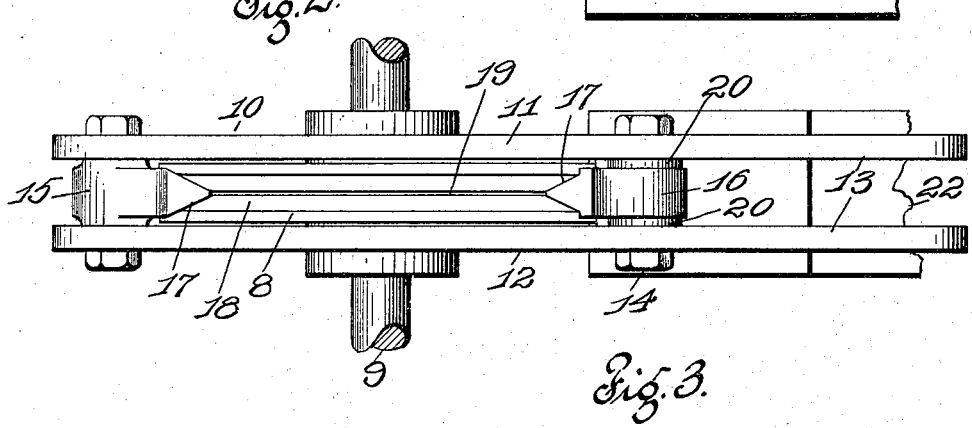
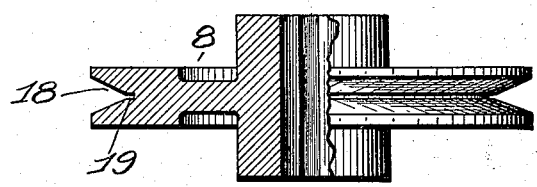
Witnesses
W. C. Stein
B. Austin
Inventor
Ludwig Schmidt
by Alfred A. Hicks atty.

L. SCHMIDT.
FRICTION BRAKE AND RATCHET.
APPLICATION FILED FEB. 14, 1914.
1,171,357.
Patented Feb. 8, 1916.
2 SHEETS—SHEET 2.
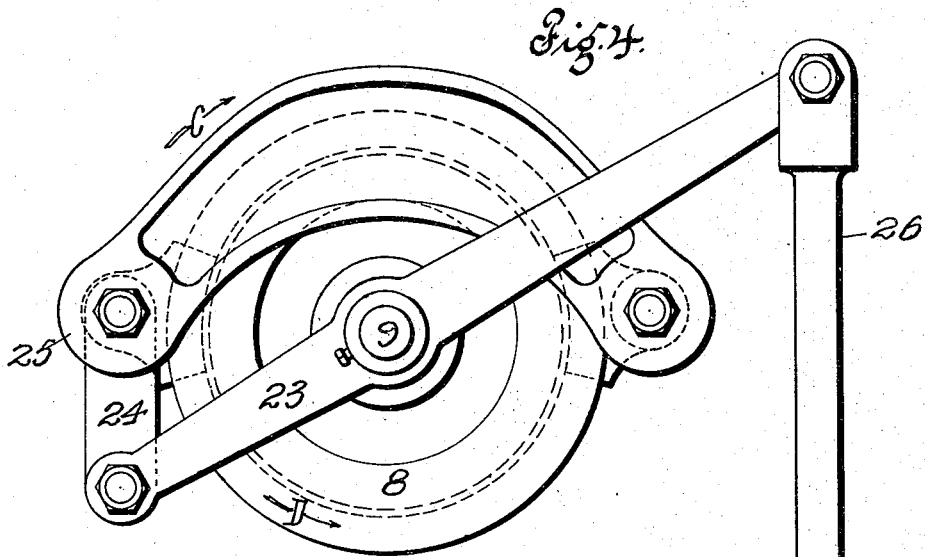
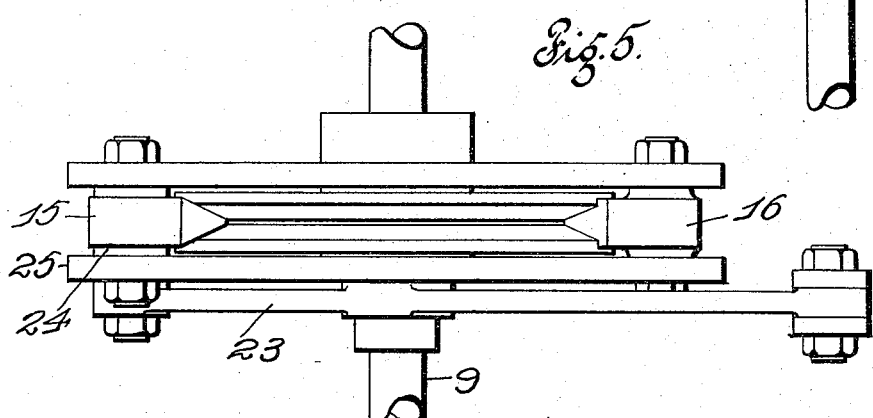
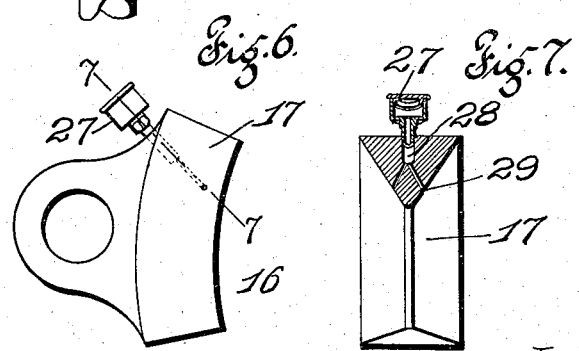

UNITED STATES PATENT OFFICE.

LUDWIG SCHMIDT, OF ST. LOUIS, MISSOURI.

FRICTION BRAKE AND RATCHET.

1,171,357.　　　　　　　Specification of Letters Patent.　　　Patented Feb. 8, 1916.

Application filed February 14, 1914. Serial No. 818,665.

*To all whom it may concern:*

Be it known that I, LUDWIG SCHMIDT, a citizen of the United States, and resident of St. Louis, Missouri, have invented certain new and useful Improvements in Friction Brakes and Ratchets, of which the following is a specification.

This invention relates to improvements in a friction brake and ratchet, and has for its object a yoke partially incasing a sheave, and shoes so located as to communicate with the groove of the sheave to brake the wheel by friction or to operate the wheel step by step by frictional contact.

A further object of my invention is to construct a mechanism which can be used either as a friction brake for frictionally locking a wheel to prevent reverse movement, or as a frictional ratchet mechanism for rotating the wheel step by step by frictional contact.

Figure 1 is a side elevation of my complete invention showing the same in operative position. Fig. 2 is a top plan view of the same. Fig. 3 is a plan view of the sheave wheel with a part broken away and in section. Fig. 4 is a side elevation of my invention when used as a ratchet. Fig. 5 is a top plan view of the same. Fig. 6 is a side elevation of one of the shoes. Fig. 7 is a sectional view thereof taken on the line 7—7 of Fig. 6.

Referring to the drawings in detail, 8 indicates a wheel of the sheave type, which is mounted on a shaft 9, which constitutes a part of the operating mechanism by which the sheave is rotated. Over this sheave is located my improved friction brake consisting of a yoke 10 composed of two members 11 and 12, each provided with an integral projecting arm 13 which is to be used when necessary for elevating the yoke on its pivot 14. In this yoke and between the members 11 and 12 is located a pair of friction shoes 15 and 16; the shoe 15 is pivotally held in position by the bolt 16; the contacting surface 17 is tapered as illustrated and its inclined face registering in the groove 18 formed in the periphery of the sheave; the base of this groove is recessed as indicated by the numeral 19 so as to permit the inclined surface of the shoe to snugly fit into the groove of the sheave and to allow for foreign substance which might collect in the groove. The shoe 16 is likewise constructed as the shoe 15, but is supported on the pivot 14, and on said pivot on each side of the shoe 16 are links 20 which communicate with and are pivotally attached to ears 21 located on a suitable rigid base 22.

The yoke is so constructed as to have the center of the pivotal point of the shoes slightly above the center line of the shaft 9; this arrangement provides a fulcrum permitting the sheave to freely operate in the direction as indicated by the arrow A, but as soon as the mechanism is stopped, and should the same have a tendency to rotate rearwardly or in the opposite direction as indicated by the arrow B, the shoes in the groove will be drawn downwardly toward the center line of the axis or rigidly bind in the groove of the sheave acting as a fulcrum, firmly locking the wheel, and the mechanism to which it is attached.

A mechanism of this character is especially adapted for use in various machines, which operate on inclines or machinery such as concrete mixers where tons of material are rotated, and when stopped the weight of the material having a tendency to partially rotate the mechanism in opposite direction, but with the application of this improved frictional brake, the greater the pressure, the tighter and more firm the brakes will bind against the sheave.

In Figs. 4 and 5 I show the construction similar to the brake mechanism, but in this instance I use the same as a frictional ratchet and the mechanism to operate the ratchet consists of the pivotal arm 23 mounted on the shaft 9, its one end connected to links 24 attached to the end 25 of the yoke, the opposite end of the arm attached to a connecting rod 26, which is attached to a mechanism necessary for applying reciprocatory motion to the same.

When using my invention as a friction ratchet, the shoes are likewise in position as described when using the same for a friction brake, the center of the shoes being located partially above the center line of the shaft 9 and whenever the connecting rod 26 is pulled downwardly, the shoes, together with the yoke, are permitted to move freely on the sheave in the direction as indicated by the arrow C and by each upward movement of the connecting rod 26, the shoes are drawn downwardly permitting each shoe to bind by frictional contact in the groove of the sheave moving the sheave step by step in a direction as indicated by the arrow D.

The shoes used in connection with my invention are provided with an oil or grease cup 27, which supplies oil or grease in the opening 28 and permits the same to pass through the ports 29 leading therefrom, and having an outlet on the inclined base of said shoe.

The essential feature of my invention is to brake a wheel by frictional contact, or by operating a wheel in the ratchet method by frictional contact, and to locate the shoes in such a manner during its operative movement, to move toward the given center, firmly gripping the same to firmly lock the wheel for braking the same or for operating the same by the ratchet principle.

Having fully described my invention what I claim is:

1. A device of the class described comprising a grooved wheel, a pivoted yoke, shoes carried thereby, said shoes communicating with the wheel, and located slightly above the center line of axis to automatically bind the same whenever the wheel chances to move in reverse direction.

2. A device of the character described comprising a pivoted yoke, in combination with a grooved wheel partially encircled by said pivoted yoke, shoes carried by the yoke and designed to communicate with the periphery of the wheel, said shoes positioned slightly above the center line of axis of the wheel and designed to firmly hold the wheel by frictional contact whenever the same chances to operate in reverse direction.

3. A device of the character described comprising a pivoted yoke in combination with a sheave wheel, bevel-faced shoes carried by the pivoted yoke and communicating with the groove of the sheave, the pivot line of said shoes being slightly above the center line of axis so as to provide a frictional locking surface whenever the sheave wheel chances to operate in reverse direction, and means for holding one shoe in set position, substantially as specified.

4. A device of the character described comprising a brake consisting of a double pivoted yoke a pair of shoes pivotally connected thereto, means for supporting the pivoted yoke and one of the shoes in a set position, a grooved wheel, the pivotal center of the shoes being on a line slightly above the center line of axis of the wheel, said shoes being so positioned as to permit the wheel to freely operate in one direction and to cause the shoe on the free end of the pivoted yoke to partially move with the wheel when chancing to operate in a reverse direction firmly locking the same by frictional contact.

In testimony whereof, I have signed my name to this specification, in presence of two subscribing witnesses.

LUDWIG SCHMIDT.

Witnesses:
 ALFRED A. EICKS,
 WALTER C. STEIN.

Copies of this patent may be obtained for five cents each, by addressing the "Commissioner of Patents, Washington, D. C."